United States Patent [19]

Kris

[11] Patent Number: 4,630,193

[45] Date of Patent: Dec. 16, 1986

[54] TIME MULTIPLEXED PROCESSOR BUS

[75] Inventor: Bryan Kris, Warminster, Pa.

[73] Assignee: Textron, Inc., Horsham, Pa.

[21] Appl. No.: 428,488

[22] PCT Filed: Apr. 27, 1981

[86] PCT No.: PCT/US81/00542

§ 371 Date: Sep. 23, 1982

§ 102(e) Date: Sep. 23, 1982

[87] PCT Pub. No.: WO82/03931

PCT Pub. Date: Nov. 11, 1982

[51] Int. Cl.⁴ ............................................. G06F 13/42
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,699,529 | 10/1972 | Beyers et al. | 340/172.5 |
| 3,810,114 | 5/1974 | Yamada et al. | 340/172.5 |
| 3,813,651 | 5/1974 | Yamada | 340/172.5 |
| 3,886,524 | 5/1975 | Appelt | 340/172.5 |
| 3,980,992 | 9/1976 | Levy et al. | 340/172.5 |
| 4,096,571 | 6/1978 | Vander Mey | 364/200 |
| 4,161,786 | 7/1979 | Hopkins et al. | 364/900 |
| 4,219,873 | 8/1980 | Kober et al. | 364/200 |
| 4,223,380 | 9/1980 | Antonaccio et al. | 364/200 |
| 4,253,146 | 2/1981 | Bellamy et al. | 364/200 |
| 4,281,381 | 7/1981 | Ahuja et al. | 364/200 |
| 4,360,767 | 11/1982 | Akiyama et al. | 318/318 |
| 4,481,572 | 11/1984 | Ochsner | 364/200 |
| 4,488,232 | 12/1984 | Swaney et al. | 364/200 |

OTHER PUBLICATIONS

Short, Kenneth L., *Microprocessors and Programmed Logic*, Prentice Hall, Inc., Englewood Cliffs, NJ 1981, pp. 254-256.

"Rapid Bus Multiprocessor System" by Zoccoli and Sanderson, Nov. 1981 issue of *Computer Design*, pp. 189-200.

*Primary Examiner*—Thomas M. Heckler
*Attorney, Agent, or Firm*—Dann, Dorfman, Herrell and Skillman

[57] ABSTRACT

A multi-master processor bus and a method of processing data which permits multiple microprocessors to communicate freely and inexpensively among themselves and various system resources. The bus uses a multiphase clock and latches to provide time slice signals to sequentially activate each processor, one at a time in a repetitive sequence. The bus includes cables and terminals for each of the cables with means for interconnecting each of the modules in series daisy chain fashion to selected cables.

8 Claims, 9 Drawing Figures

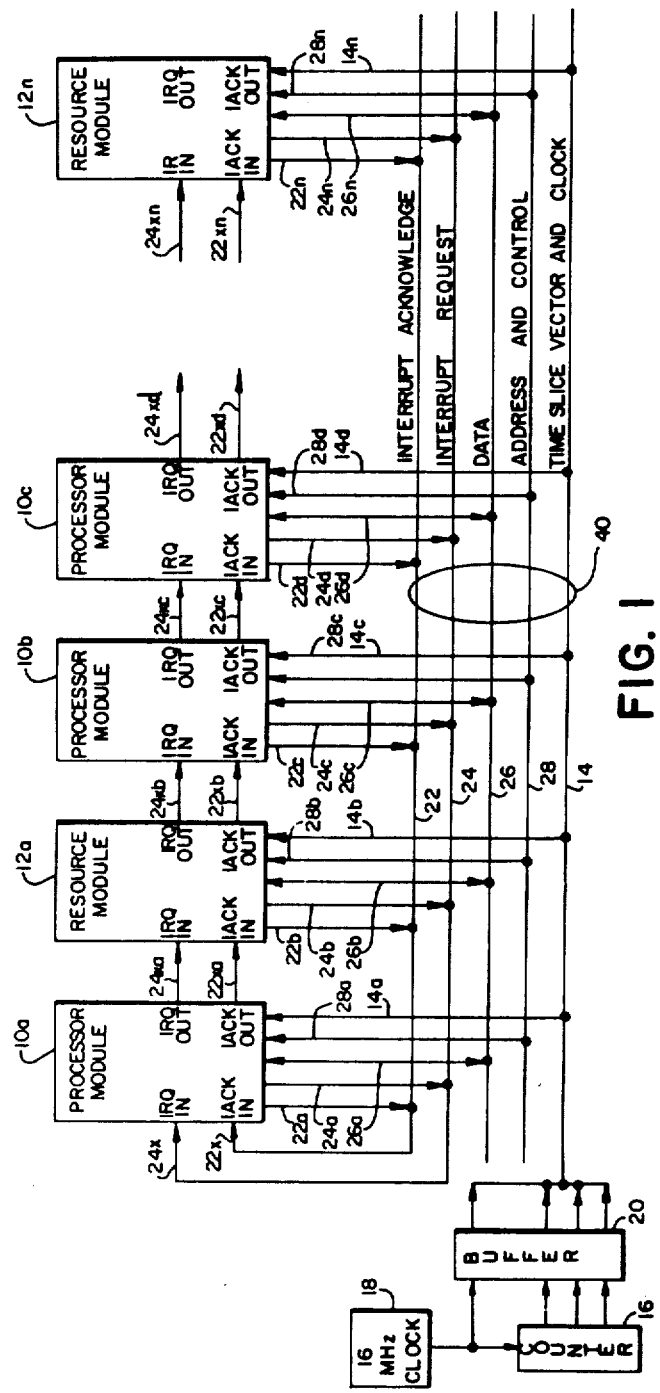

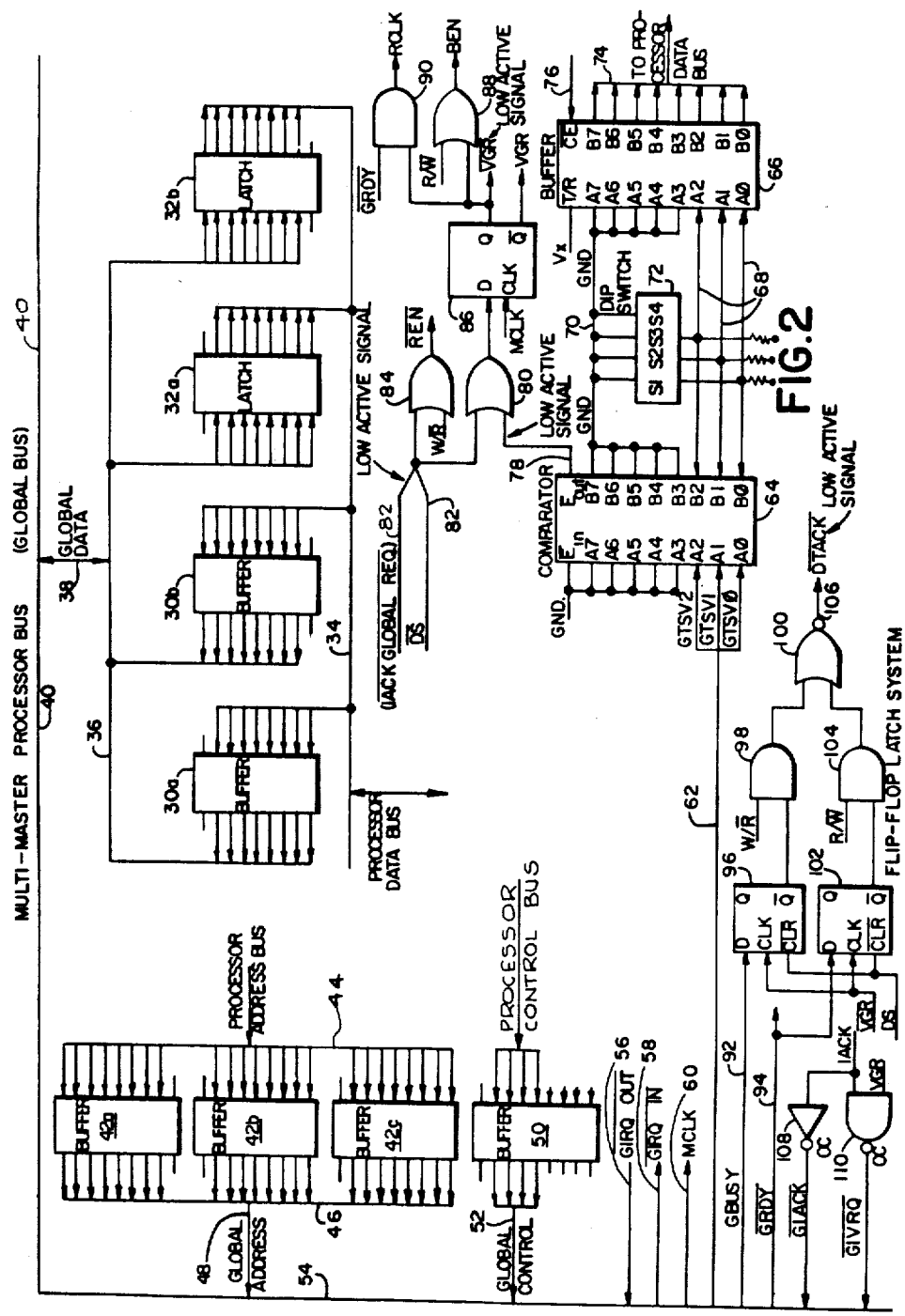

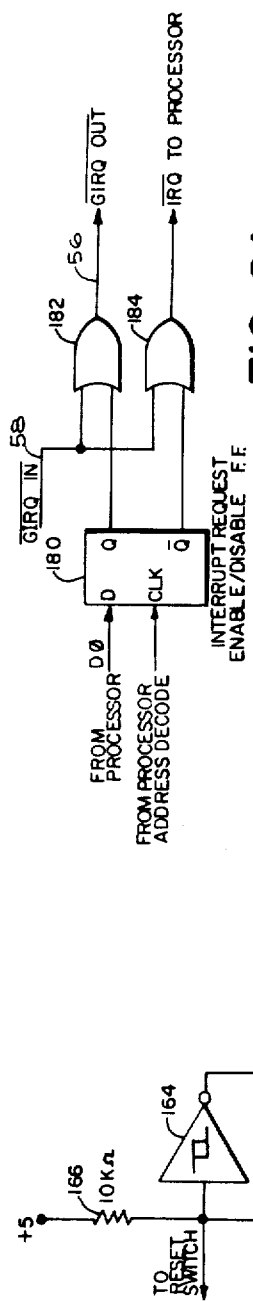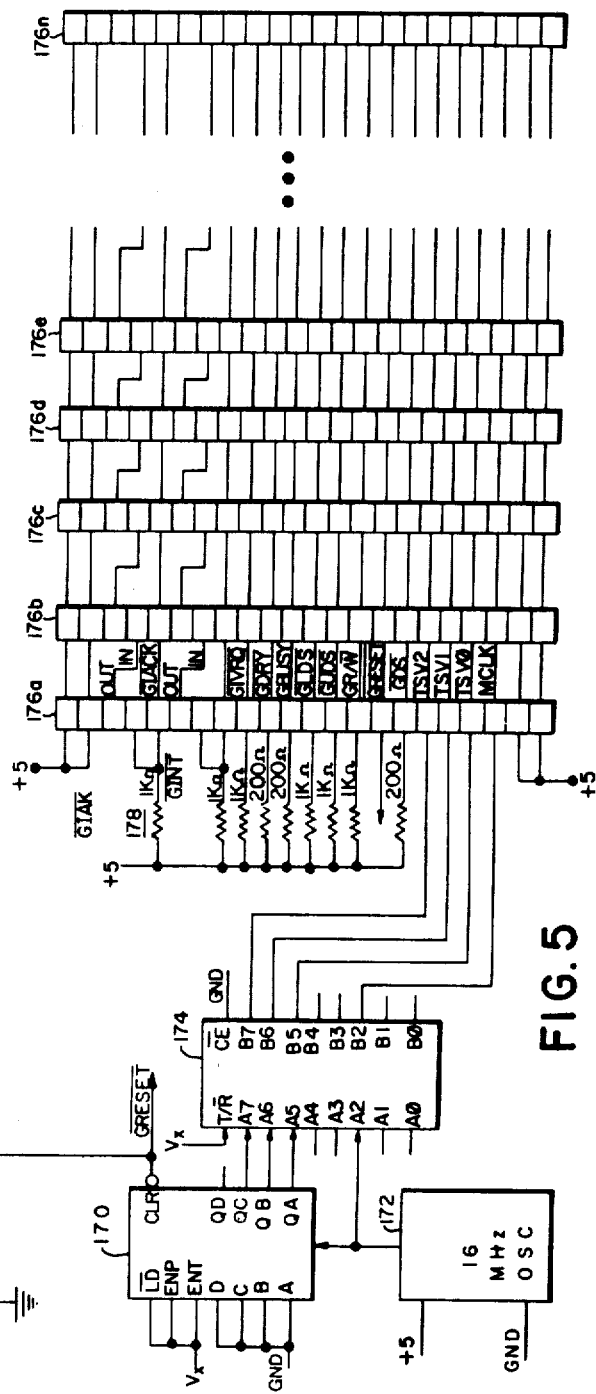

TIME MULTIPLEXED PROCESSOR BUS

The present invention relates to a multi-master processor bus which permits multiple microprocessors to communicate freely and inexpensively among themselves and various system resources. The invention permits easy expansion of functionality without modification of the individual processors and thus contemplates a very large scale computer system which can be built with a number of microprocessors.

THE PRIOR ART

The current state of the art technology allows only one to three processors to share a common system bus at the same time. Many of the bus structures in use today cannot even handle two processors without elaborate and expensive direct memory access (DMA) controllers, bus multiplexers and conflict resolvers.

Current microprocessor system buses are extremely wasteful in exploiting bus bandwidth. When a microprocessor accesses a typical system bus, it will wait on the bus until it receives or transmits the desired data. Most microprocessors have a bus cycle time of 500 to 1000 nsec. The actual data transfer could be accomplished within a fraction of that period. While a given processor is waiting for its data, it effectively locks out any other processors from using the bus.

THE ADVANCE OF THE PRESENT INVENTION

The multi-master processor bus of the present invention allows a large number (N) of processors to share a common system bus simultaneously without conflict and requires very little or no hardware overhead and very simple software that is embedded within each processor board. Each processor board is identical to each other in every respect, mechanically, electrically, and in firmware (if desired). A limit of eight master processors is typically chosen as a practical guide for assembly and test, but additional processors theoretically could be added to the system.

In accordance with the present invention the backplane that supports the bus is a simple standard network of wires that interconnects the various system modules. The system controller is made up of only two standard medium scale integration chips (MSIs) that can be integrated within the backplane.

The multi-master processor bus greatly increases the effective bandwidth of the system bus by employing a time multiplex packet driven architecture. The architecture allows unlimited global system resources, it allows each master processor unlimited private resources and allows multiple multi-master processor buses to be interconnected.

THE PRESENT INVENTION

More specifically, the present invention relates to a multi-master processor bus for interconnecting a plurality of processor modules comprising a plurality of cables each having a plurality of connecting lines to a plurality of sets of processor module terminals for attachment to a plurality of processor modules. Cables are supplying at least the following purposes: interrupt request; interrupt acknowledge; address and control; time slice vector and clock; and data. Clock means provides periodic impulses and counter means is associated with the clock to count the impulses and generate a multiphase clock. The cable connections include cables and means for interconnecting each of the modules in series daisy chain fashion to both the interrupt request and interrupt acknowledge cables.

The invention also contemplates a method of processing data using a plurality of master processors which are provided with parallel cable connections to a bus. By the method one of the master processor is selected arbitrarily to be the master master processor to designate which processor shall be active, accept data or output data to other processors. Time slice signals are then provided to sequentially grant access to the bus by each of the processors one at a time in a repetitive sequence.

DRAWINGS OF A PREFERRED EMBODIMENT OF THE INVENTION

A preferred embodiment of the present invention is illustrated in the accompanying drawings in which:

FIG. 1 is an overall block schematic diagram of the multi-master processor bus in the connection system, showing interconnections of a plurality of processors;

FIG. 2 is a more detailed schematic block diagram showing a bus/processor interface typical of the present invention;

FIG. 2A is a block diagram showing the interrupt request enable/disable portion of a processor module;

FIG. 5 is a multi-master processor bus backplane schematic with certain block input elements illustrated;

Figure 6:
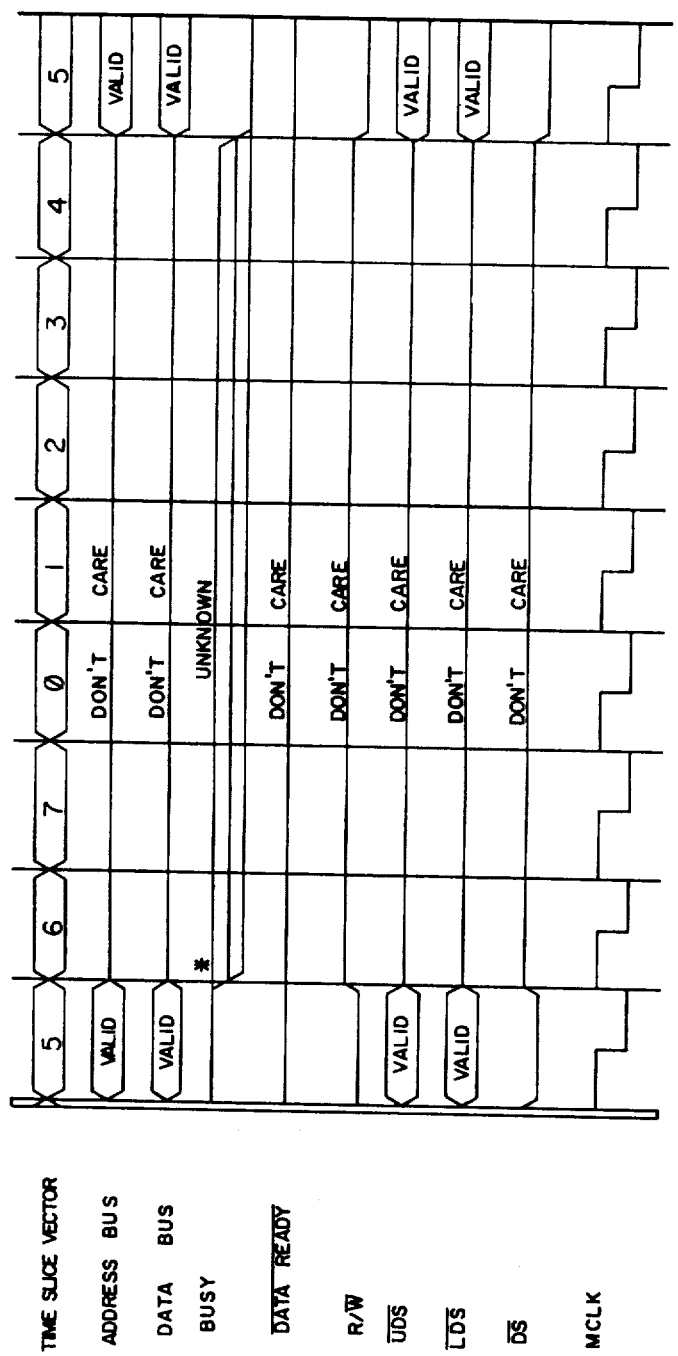
Figure 7:
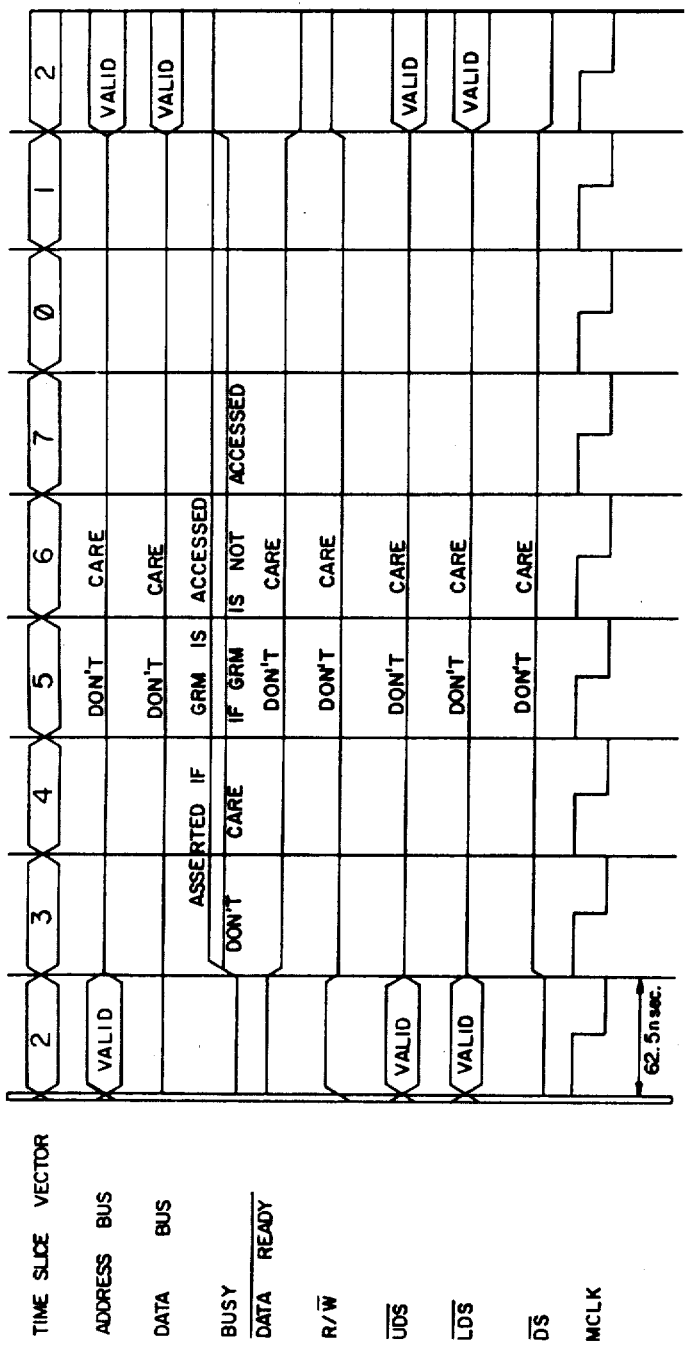
Figure 8:
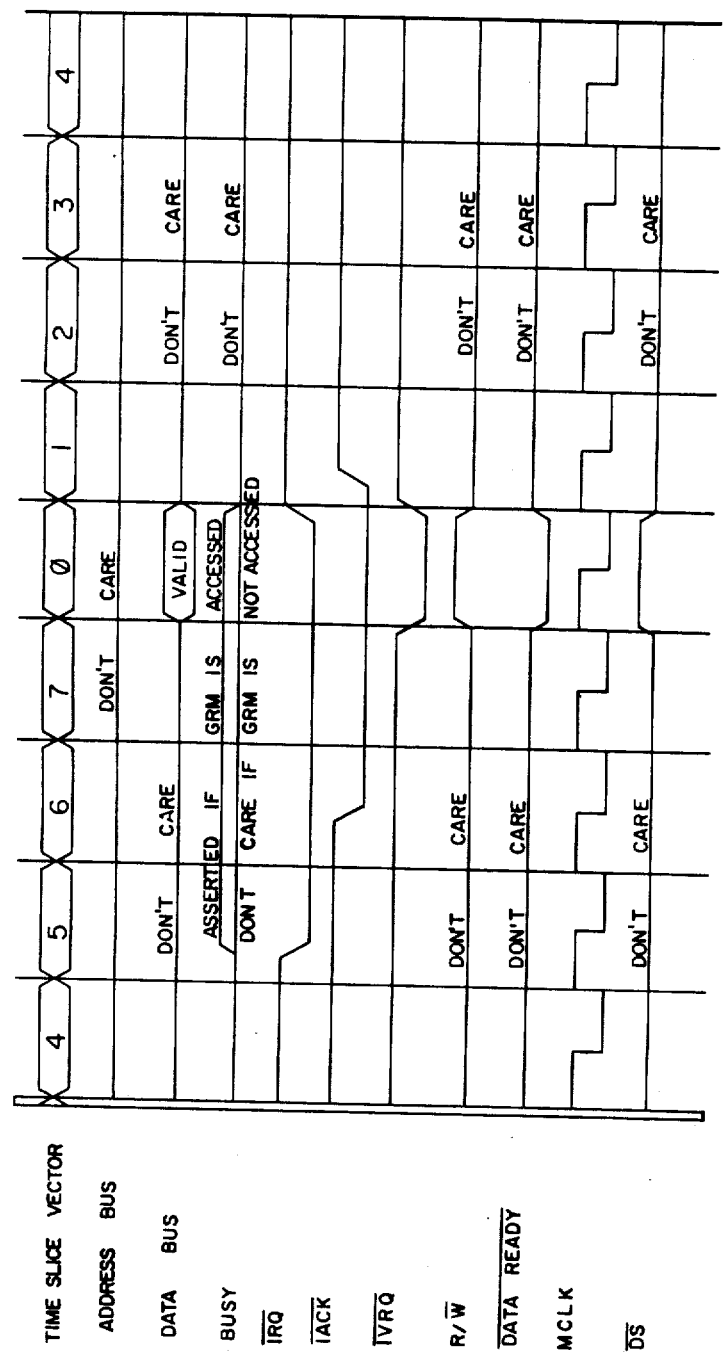

FIGS. 6, 7, and 8 are each composite time scale graphs relating to various signals within a multi-master system.

The system in accordance with the present invention consists of master processor modules, global resource modules, system timing controller and a backplane.

A master processor module contains a processor and some combination of read only memory, read/write memory, input/output devices and control logic. These components are for the private use of the processor. The processor module also contains an interface to the system bus. Only processor modules may access the system bus. Processor modules are also known as bus masters or master modules.

A global resource module may be any combination of read only memory (ROM), read/write random access memory (RAM), input and output devices (I/O), and dedicated processor subsystems. It also contains an interface to the system bus. Global resource modules may not access the system bus unless specifically requested by a master processor.

The system timing controller consists of a master clock and logic to provide an N phase system clock that is encoded into log 2N bit fields. This logic preferably is incorporated into the backplane bus circuit board.

The backplane is a simple linear array of sockets and interconnections for the system. The various system modules may be plugged into the backplane in any sequence and in any quantity as long as the master processor limit of N is not exceeded.

Another feature of the multi-master processor bus system is that each system module may run asynchronously with respect to each other The system bus, however, is a synchronous bus. The multi-master processor bus is also called a "global bus".

Each master processor module may be a self-sufficient computer, capable of operating even if it is not plugged into the multi-master processor bus.

Referring first to FIG. 1, a multi-master processor bus system is shown schematically. In this diagram, there are a plurality of processor modules 10a, 10b, 10c, and implicitly there are other modules up to 10 m. Similarly, there are shown resource modules 12a and 12n with the possibility of intermediate resource modules. The resource modules as explained above are connected to the multi-master processing bus, or global bus 40 only in response to actions or commands from a processor module 10a, 10b, 10c . . . .

The multi-master processor bus 40 consists of a plurality of multi-wire cables. One of those cables is time slice vector and clock bus 14. Connections are made to the bus 14 from the various modules by connection lines. Processor module 10a is connected by connection 14a. Resource module 12a is connected to bus 14 by lines 14b. Processor module 10b is connected by lines 14c. Processor module 10c is connected by lines 14d. Processor resource module 12n is connected by lines 14n. As illustrated in FIG. 1, the processor modules and the resource modules are connected in parallel with one another to the bus 40. The time slice vector and clock bus 14 is provided an input from a counter 16 which is triggered by a 16 megahertz clock 18. The output of the counter 16 is applied to buffer 20 which also buffers the clock 18. The buffer puts a count signal comprised of a number of binary pulses, the number of pulses being related to the number of master processor modules being utilized in the system out on the time slice vector and clock bus 14 and thereby enables application of the count signal to each of the modules. The count signal is decoded by circuitry in each master processor module in a manner which will hereinafter be described.

The multi-master processor bus also includes an interrupt acknowledge bus 22 and an interrupt request bus 24. An interrupt request signal can be generated by any of the modules and placed on the interrupt request bus 24 by connection buses 24a, 24b, 24c, 24d, and 24in. The interrupt request signal is applied by the interrupt request bus 24 to the input of the first processor module 10a via bus 24x. The interrupt request signal is then daisy chained down the line of master processor and resource modules in the usual well-known manner as shown. Although the interrupt request signal is usually generated by a resource module it could be generated by a master processor module.

An interrupt acknowledge signal can be generated by any of the master processor modules and is placed on the interrupt acknowledge bus via lines 22a, 22c, 22d, etc. The interrupt acknowledge bus 22 is connected by input bus 22x to master processor module 10a which, in turn, is interconnected by bus 22xa to resource module 12a and to the other modules in the daisy chain fashion.

Data bus 26 and address and control bus 28 complete the essential buses, and each of them has bus connections to the modules as follows: connection cables 26a and 28a to processor module 10a; cables 26b and 28b to resource module 12a; cables 26c and 28c to processor module 10b; connection cables 26d and 28d to processor module 10c; connection cables 26n and 28n to processor module 12n. The multi-master processing bus architecture shown in FIG. 1 supports a very powerful operating system that is extremely small in size and relatively simple in overall complexity. The multi-master processor bus signals require differing numbers of lines in the global bus. The following numbers of lines are typically required for the specified signals: 23 for Address; 16 for Data; 3 for Time Slice Vector; 1 for Device Busy, 1 for Read/Write, 1 for Upper Byte Data Strobe; 1 for Lower Byte Data Strobe; 1 for Reset; 1 for Global Interrupt Request; 1 Global Interrupt Daisy-Chain In; 1 for Global Interrupt Daisy-Chain Out; 1 for Master 16 MHZ Clock; 1 for Data Ready; 1 for Interrupt Vector Request; 1 of Global interrupt Acknowledge; 1 for Global Interrupt Acknowledge Daisy-Chain In; and 1 for Global Interrupt Acknowledge Daisy-Chain Out making a total of 56 lines.

Each master processor module 10a, 10b, 10c, 10n is self-sufficient as a computer system. Preferably, but not necessarily, each master processing module is identical to every other module. An encoder means (Not shown) is employed in connection with the counter 16, clock 18, and buffer 20 system to assign a given master processor module its time slice, and each master processor module is given an individual time slice.

Upon system initialization, each master processor module initializes its own system components. The system components may consist of universal asynchronous receiver transmitters (UARTs), parallel input/output devices (PIOs), etc. At this stage, each master processor module then reads its time slice encoder to determine where in the global memory (predefined points) each successive master processor module can pass information and commands to the other master processor modules. Each master processor module then clears its own command block and global memory and sets a flag that signals other master processor modules that it is present and functioning properly.

The master processor module, which was assigned a zero time slice by arbitrary choice is designated the master master processor module. The master master processor module assumes the duties of the system supervisor and is responsible for initializing the global resource modules in the system. It also assigns other master processor modules to various tasks as needed. Each master processor module as it completes its assigned tasks enters an idle loop and checks its command block and global memory for new tasks to perform. The command block is a segment of memory set up by the master master processor module to allow communications among various master processor modules and contains commands, pointers to program and data structures, and status words needed to perform a task.

The various master processor modules are connected in a so-called "daisy chain" to other master processor modules. The master master processor module, if it is the earliest master processor module in the interrupt request daisy chain 24x, 24xa, 24xb, 24xc, 24xd, . . . 24xn, can be used to handle all global interrupt requests by always enabling interrupts to itself and inhibiting the interrupt request signals from progagating through the daisy chain to the other master processor modules. The master master processor module then performs the required system functions prior to assigning a master processing processor module to process the interrupt generated task.

The master master processor module is a supervisor only by default and at any time and for any reason may transfer its system responsibilities to any other master processor module. For example, it may detect an internal hardware fault and trigger the change.

Each master processor module may communicate with other master processor modules through a "back door" (a communication link external to the multi-master processor bus) to allow the system to recover from catastrophic faults. For example, it is possible the master master processor module may encounter a severe fault. This ability allows the remaining master processor modules to choose a new master master processor module and ignore the failed master master processor module. If the processor is unable to interrupt the attempted comunications with the continuously busy resource module after a predetermined time period, the processor will become locked up in the sense that the processor will be unable to disengage from attempted communications with the busy resource module and consequently will be unable to perform any other functions. The processor will wait indefinitely to communicate with the busy resource module even though such communications may never be effected due to a fault in the system. Perhaps a master processor module would access a global resource module that was always busy and this condition could lock up the master processing module without time-out capability. Each master processor module should also have internal time-out capability to enable the master processor module to disengage itself from a global bus transaction in the event of a serious bus fault. A processor having a time-out capability can disengage from performing a particular function if the function is not performed within a selected time period. Consequently, the time-out capability is a safeguard which prevents a processor from waiting for an indefinite time period to perform a function which may not be possible to effect due to a fault in the system. In other words, the time-out capability helps to prevent the lock up of a processor.

It will be understood that there are other ways of operating the system of the present invention and the above description is intended to be by way of example of what can be done.

FIG. 2 is an example of an interface between a multi-master processor bus and a processor module for example, a master processor module employing a Motorola 68,000 microprocessor.

Referring now to FIG. 2, the structure shown is a multi-master processor bus/master interface example. As seen in FIG. 2, a processor data bus 34 is connected to the global bus 40 through a series of buffers 30a, 30b, and latches 32a and 32b used to collect data from the global bus 40 through a global data path 38 by way of input bus 36. The buffers are conventional buffers used to connect to or isolate an individual processor and the global bus. The latches are registers used to latch data from the global bus during those times which are the individual processor's time slice. Internal cables connect the processor through the cable 34 to the buffers and latches and cable 36 through global data interchange connects the buffers and latches to the multi-master processor or global bus 40. The interface circuitry, as illustrated, for the microprocessor, such as the Motorola 68,000 microprocessor, is designed to permit the microprocessor to directly execute data from a resource module, for example, as instructions without any need to first interpret the data.

In addition to the data interchange to the system described, there is a series of buffers 42a, 42b, 42c between a common address bus 44 to the processor and an output cable 46 to the global address system. Global address contact is made through cable 48 to the multi-master processor bus 40 or global bus. Through this system the global resource is addressed and selected.

Also involved is a global control which may have to do with other procedural processing factors which are handled through buffer 50 through a global control cable 52 to the multi-master processor bus.

The Global Interrupt request daisy chain input and output is represented by lines 58 and 56, respectfully. If this Master Processor module is not to support interrupts, these lines would be connected, thus passing the Global Interrupt Request to the next module. If this module is to support the Global Interrupts, FIG. 4 describes the appropriate circuitry.

Line 60 connects the 16 megahertz clock from the global bus to the interface logic as needed. Line 62 connects the global bus to a comparator 64 which compares the three bits count signal from the line slice vector bus (GTSV2, GTSV1, GTSV0) with the module's unique time number that is encoded by the dip switch 72. The buffer 66 allows the processor within the master processor module to read the value encoded by dip switch 72. If the module's number matches the count signal on the global bus, the output signal 78 becomes low-active. If this master processor module wants to access the global bus for example, to access data ($\overline{DS}$) or to respond to a global interrupt (IACK Global Req.), the processor causes line 82 to become low active. Thus, the OR gate 80 becomes the equivalent to a low level AND gate whose output (when low) indicates that this master processor module wants to access the global bus and that the count signal matches its own module number. The output of OR gate 80 is latched by the D-type flip flop 86. The presence of outputs at the Q and $\overline{Q}$ terminals of flip-flop 86 indicates that this master processor module has requested and been granted a Valid Global Request (VGR or $\overline{VGR}$).

If the master processor module is attempting to write data out onto the global bus and into a resource module, the master processor module causes the Read/$\overline{Write}$ line into OR gate 88 to become low active. Thus, if the master processor module has been granted a Valid Global Request and the request is to write data, the output bus enables signal $\overline{BEN}$ from OR gate 88 to become low active. The $\overline{BEN}$ signal enables the buffers 30a and 30b to pass the data from the module's internal data bus 34 to the global data bus 38. The VGR signal from the flip-flop 86 enables the address buffers 42a, 42b, 42c and the control buffer 50 to pass the address and control signals from the master processor modules address bus 44 and control bus 45 to the global address control bus. If the Resource Module that is addressed by this master processor module is able to accept the data on the global data bus, it will not assert the GBUSY line 92. The "not busy" signal along line 92 is presented to the D input terminal of D-type flip-flop 96 and is clocked into flip-flop 96 by the VGR signal from flip-flop 86. The Q output of flip-flop 96 is gated through AND gate 98 in the presence of a write not read signal W/R from the processor and passes to the NOR gate 100 to generate a low active data transfer acknowledge signal DTACK on line 106. The DTACK signal is used to notify the processor within this module that the transaction over the global bus has been completed.

If the master processor module has been granted a valid global request and is attempting to read data from a resource module on the global data bus, and the data from the resource module is ready as indicated by the presence of a global ready signal GRDY on line 94, a positive going signal is generated on the output of the AND gate 90 at the end of the current time slice. The output signal from AND gate 90 is used to clock the data from the global data bus into the latches 32a and 32b.

The global ready signal ($\overline{\text{GRDY}}$) on line 94 is also clocked into D-type flip-flop 102. The output of flip-flop 102 is applied to one input of AND gate 104. The read not write signal R/$\overline{\text{W}}$ from the processor is applied to the other input of AND gate 104 to produce an output signal. The output signal from AND gate 104 is fed into NOR gate 100 to generate the $\overline{\text{DTACK}}$ signal used to indicate to the processor that the read from the global resource module has been successfully completed.

The system of FIG. 2A is associated with the system of FIG. 2 and represents a logic circuit used by a processor to steer the global interrupt request to itself or pass it down the line of processors in connection with the activity of the global bus. The circuit is relatively simple consisting of a flip-flop 180 that is controlled by the processor to steer the global interrupt request $\overline{\text{GIRQ IN}}$ signal.

Depending upon whether the Q or $\overline{\text{Q}}$ output terminals of flip-flop 180 is low active, the respective OR-gate 182 or 184 will pass the Global interrupt request daisy chain input signal ($\overline{\text{GIRQ IN}}$) to the Global interrupt request daisy chain output ($\overline{\text{GIRQ OUT}}$) or to the Interrupt request line ($\overline{\text{IRQ}}$) of the modules' processor.

Figure 3:
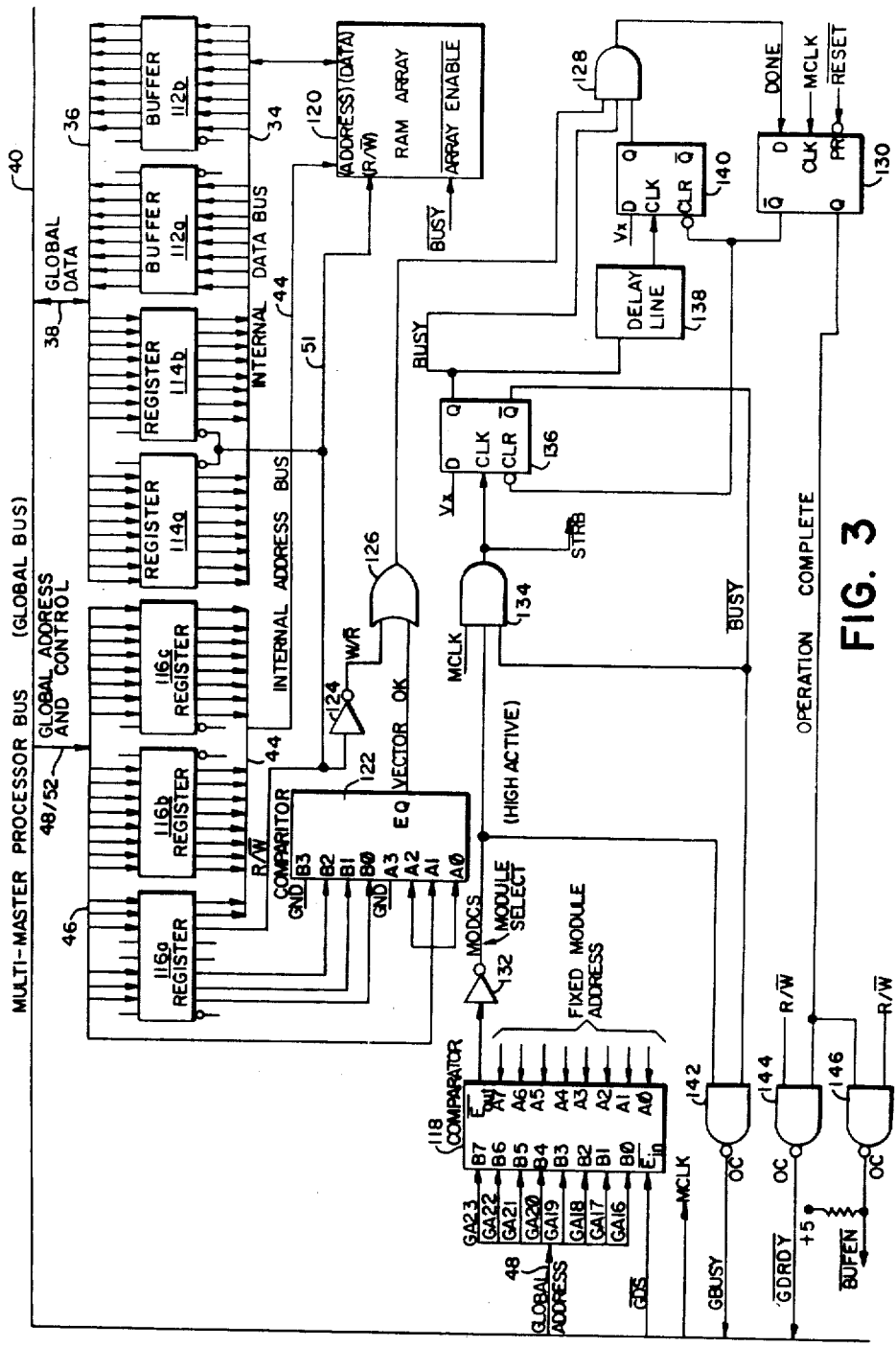
FIG. 3 is a similar block diagram of a bus/resource module interface example.

FIG. 3 is an example of the interface logic needed to build a global resource module. In this example, the module is a memory module without the ability to request global interrupts. It should be noted in this regard that each module responds to an 8 bit address field. The most significant 8 bits of the address is the module address. The logic involves a delay line which is used to match the bandwidth of the incoming request with the bandwidth of the memory devices.

As in FIG. 2, access in FIG. 3 to the global bus 40 is through a global data line 38 or through a global address and control line 48/52. Global data is provided through buffers 112a and 112b or through registers 114a and 114b. Data is fed through an internal data bus line 34 from the RAM array 120. RAM array 120 is addressed through the internal address line 44. Read and write instructions are given through an internal R/$\overline{\text{W}}$ line 51, which is also connected to registers 114a and 114b. The address presented by the master processor is fed through the global bus to the global address and control lines 48/52 to the registers 116a, 116b, and 116c which store the address presented by a master processor, whichever one is selected. Key data indicating the module number of a master processor module making a read or write request is fed from register 116a to the terminals B0, B1, B2 of comparator 122 which compares the module's number to the current count signal and provides an output signal (vector OK) when the comparison is positive. At the same time, the read, not write, signal R/$\overline{\text{W}}$ is inverted by inverter 124 to a write, not read signal W/$\overline{\text{R}}$ which is applied to one terminal of an OR gate 126. The OR gate 126 serves to pass the W/$\overline{\text{R}}$ or the vector OK signal from comparator 122 depending upon whether a read or a write has been requested by the master processor module making the request.

Global address information is also fed from the global bus line 48 to the comparator 118 which provides an output whenever the global address matches the fixed or hard wired module address. The low active output from the comparator 118 is inverted by inverter 132 and is fed to one input of a three input AND gate 134. The output of AND gate 134 is fed to the clock terminal of another D type flip-flop 136 and to the clock inputs of registers 116a, 116b, 116c, 114a and 114b as a strobe (STRB). The AND gate 134 clocks flip-flop 136 when a masterclock signal (MCLK), a module select (output from 132) and a not busy signal ($\overline{\text{BUSY}}$) coincide. A not busy signal ($\overline{\text{BUSY}}$) is generated at the Q output of the flip-flop 136 when it is actuated by the AND gate 134, and a fixed high actrive signal $V_x$ is present at its D terminal. At the same time busy signal BUSY is generated at the Q terminal of flip-flop 136. The BUSY signal is applied to the second input of AND gate 128.

A delay line 138 receives the BUSY signal from flip-flop 136 and delays the signal for a fixed period before applying it to the clock input of flip-flop 140, the Q input of flip-flop 140 being applied to the third input terminal of AND gate 128. When all three signals are present on the inputs of AND gate 128, it generates an output signal (DONE) which is applied to the D input terminal of flip-flop 130. A clear signal from the $\overline{\text{Q}}$ output of flip-flop 130 is then applied to clear flip-flops 136 and 140 after when the operation is complete. A RESET signal is required during system power up and is applied to flip-flop 130.

The Q output of flip-flop 130 provides an operation complete signal which is applied to one input of each of NAND gates 144 and 146. The NAND gates 144 and 146 generate output signals Global data ready ($\overline{\text{GDRDY}}$) and Buffer enable ($\overline{\text{BUFFN}}$) respectively. The $\overline{\text{BUFFN}}$ enables buffers 112a and 112b to put the data onto the global data bus.

Figure 4:
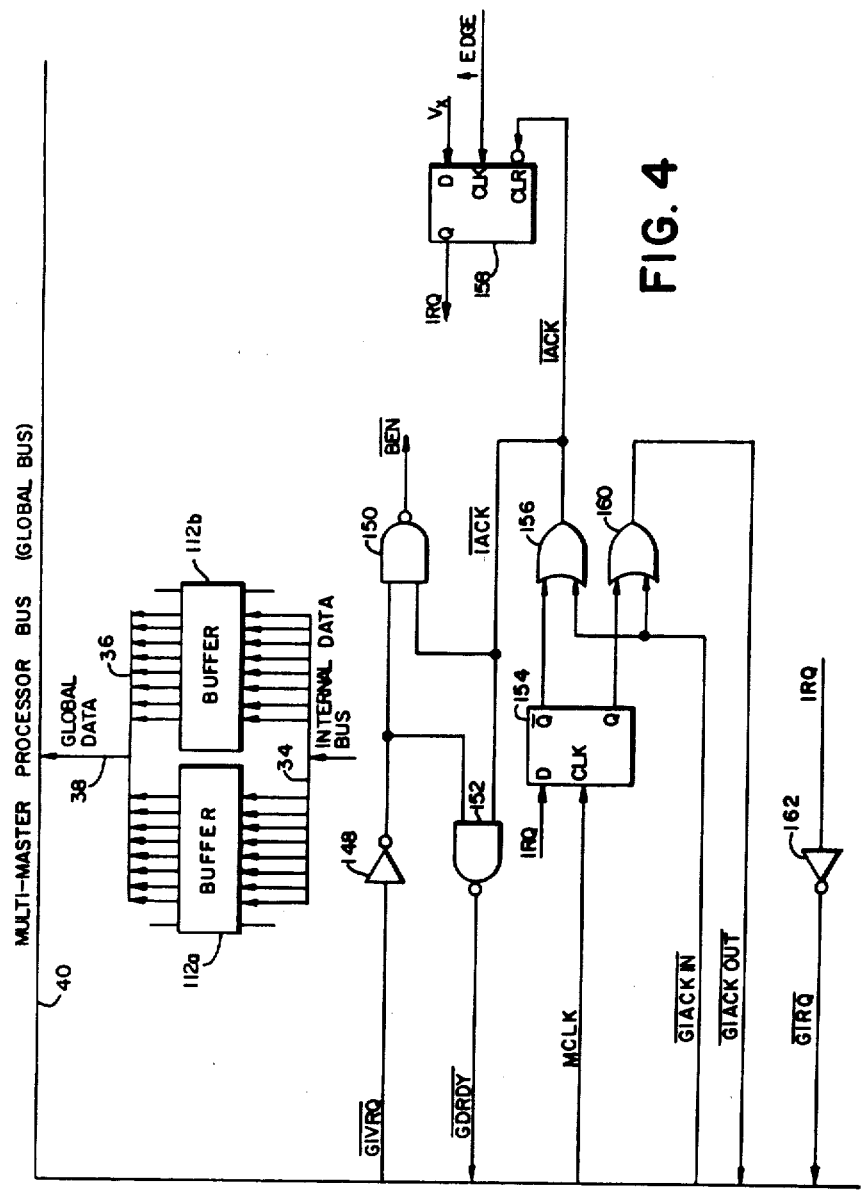
FIG. 4 is another block diagram showing a further bus/resource interface example, a module's interrupt request logic.

FIG. 4 is an example of an interrupt request interface. This interface may exist in a global resource module or in a master processor module. When a module requests an interrupt, it must have the interrupt vector ready on its internal data bus 34. Once the interrupt vector is requested, the interrupt vector is presented through the buffers 112a and 112b through the output cables to the global data line 38 and to the master processor bus 40. Low active global vector request $\overline{\text{GIVRO}}$ signal is inverted through inverter 148 and applied to one terminal of NAND gate 150 to produce a $\overline{\text{BEN}}$ (used to enable the buffers) and to one input of NAND gate 152 which produces a low active global device ready signal $\overline{\text{GDRDY}}$ at its output. Each of these NAND gates has a low active input signal indicating interrupt acknowledge $\overline{\text{IACK}}$. The master clock provides an input to clock terminal of D type flip-flop 154 and an IRQ signal is input at terminal D. The presence of an interrupt request will produce an output at each of the Q and $\overline{\text{Q}}$ terminals of D type flip-flop 154 each being applied to one terminal of OR gates 156 and 160, respectively. A signal (low active) from OR gate 156 will clear the interrupt request flip-flop 158. Flip-flop 158 receives an edge signal from a device within the module at the clock terminal and a fixed voltage level $V_x$ at the D terminal to provide an interrupt request output $\overline{\text{IRQ}}$ at the Q terminal. OR gate 156 will also transmit an $\overline{\text{IACK}}$ signal to NAND gates 150 and 152. OR gate 160 also transmits a global acknowledge out signal $\overline{\text{GIACK OUT}}$ to the global bus. When an interrupt request IRQ is generated at flip-flop 158, that signal is applied through an inverting amplifier 162 to provide a low active global interrupt request signal $\overline{\text{GIRQ}}$ to the global bus.

FIG. 5 represents a back-plane diagram showing some of the detail of the interconnection of the multi-master processor bus, or the "global bus" so-called, which has been shown generally in other drawings as member 40. The back plane provides plug-in terminal connections for circuit cards and typically a 12 card back plane assembly will fit in a standard 19 inch equipment rack. The back plane allows 2 inches of mechanical mounting overhead. The schematic drawing of FIG. 5 represents connections for the chip side of the boards connectors. Only connections for the front side of the system or approximately a sixth of the three circuit boards, for each processor, is represented. The other terminal arrays are similar to those shown, and will be understood to have similar arrangements but with different connections. The pull-up resistors are used only for some of the control signals which are generated by open-collector gates or for generating default and non-active command signals in the advent some system boards are removed. The lines between the terminal connections represent hard wiring or cable connections.

The blocks shown 170, 172, and 174 represents the count signal generator or system controller. Reset in the system is controlled through a reset switch which applies or removes a signal between a voltage divider consisting of a resistor 166 connected to a 5 volt voltage supply and capacitor 168 connected to ground which signal is applied to an inverting amplifier 164 to generate a signal representative of absence of global reset $\overline{GRESET}$. Normally $\overline{GRESET}$ is generated out of the amplifier, however, and when the reset switch is applied, that signal is also generated. In the absence of a reset signal, the count signal generator, consisting of the blocks 170, 172, and 174, is operative. The back plane of the multi-master processor bus or global processor bus 40 consist of the three groups of circuits on each side of the board. The circuits are represented by connections between terminal points on the drawing of FIG. 5 and represent one-third of the circuits on the integrated circuit side of the board. Using this "daisy chain" effect, in some cases the boards in one column, or row, are interconnected with those in the next row so as to give a sequential transfer effect. Board connectors are located in columns or rows, indicated by 176a, 176b, 176c, 176d, 176e, through 176n. Inputs to various boards include fixed and variable voltage sources with the resistors 178 to apply a predetermined potential to the input of the first panel which is transferred directly or in succession by the activity along the various cards.

THEORY OF OPERATION

The present multi-master processor bus system is based on the MC 68,000 micro-processor that has a typical bus cycle time of 500 nsec. The system timing controller divides the 500 nsec period into eight 62.5 nsec periods, one for each processor module. The time slice vector is generated by dividing a 16 MHZ clock with a three bit counter. Therefore, the counter will produce a three bit value which ranges from $0_8$ to $7_8$. Each state of the counter has a period of 62.5 nsec. This cycle is repeated every 500 nsec.

Each master processor module will have a 3 bit dip switch that is continuously compared to the time slice vector or count signal. When a match occurs, the given processor module is allowed access onto the system if it desires. This 3 bit encoder can be read by the processor and is used to allow the embedded software within the module to know if it is a master master processor module or just a master processor module. The master master processor module would assume system responsibilities such as initialization until it decided to give up its responsibilities to another master processor module.

It is assumed that the other master processor module will initialize their own subsystems and then quietly wait for instructions from the master master processor module.

A master processor module that wants to write data into a global resource module or GRM will wait until its time slice occurs; at which time, the master processor module will put Address and Data onto the Bus. The GRM's will compare the Address to their own and if the selected GRM is not busy, the GRM will latch the address and data from the bus and begin to process the request. If the GRM is already busy, the processor must wait until its next time slice before it can reissue its request.

If a process module wants to read data from a GRM, it puts the address onto the bus. If the GRM is not busy, the GRM will latch the Address and the current time slice vector. THE GRM will then process the request. When the GRM has valid data ready, it will wait for the current time slice vector to be equal the stored value. At that time, the GRM will put the data onto the bus and assert the Data Ready line. The master processor module then latches the data and proceeds with its work. If the GRM has been busy during the initial request, the master processor module will wait until it is granted access to the Bus. The interface circuity, as illustrated, for the microprocessor, such as the MC 68,000 microprocessor, is designed to prevent the word length of a communication between a microprocessor and a global resource module from inhibiting access by any other processor to the same resource module. Since information is processed on a word by word basis as single word messages, rather than a multiple word message length basis, a single processor cannot monopolize a particular resource module or even another processor module to the exclusion of the other processors.

There is no direct memory access or DMA on this Bus. A DMA device would be considered as a master processor and would have its own time slice.

All global interrupts will be "or-tied" together as a common Interrupt Request line. This signal is then daisy-chained through all of the processor modules. Each processor may either accept or reject the request. If it accepts the request, the signal is not propagated through the chain; otherwise, the request continues through the chain.

Upon accepting the request, the processor will generate an Interrupt Acknowledge that is "or-tied" with the IACK signals from the other processors. This combined signal is then daisy-chained through the interrupt requestors. The earliest requestor in the chain that has requested an interrupt will accept the IACK and the IACK is inhibited from proceeding throught he daisy-chain.

During the following Bus Cycle, the accepting processor will generate a Vector Request signal during its time slice. The requesting module will then present a 16 bit vector onto the Bus and assert the data ready signal. The processor will then latch the vector from the bus.

When a requesting module makes an Interrupt Request, the module will consider itself busy and will not accept any other request until its interrupt is accepted and completed.

FIGS. 6, 7, and 8 are intended to illustrate global system operational sequences.

FIG. 6 illustrates a write sequence for master processor module number 5 which embodies the following steps:

1. Master processor module MPM number 5 internally generates a global request to write data onto a particular GRM. (START);
2. MPM number 5 waits until its time slice occurs;
3. MPM number 5 asserts Address, Data and Control onto the global bus;
4. MPM number 5 encounters a busy signal produced by the addressed GRM;
5. MPM number 5 must wait until its next time slice to write data into the addressed GRM assuming the addressed GRM is no longer busy.

FIG. 7 illustrates a read sequence for MPM number 2 as follows:

1. MPM number 2 internally generates a global request to read data from a particular GRM (START);
2. MPM waits until its time slice occurs;
3. Assert Address and Control onto global bus;
4. If a Busy signal is asserted, go to line #2;
5. MPM number 2 waits until its next time slice to occur;
6. If the Data Ready signal is asserted, MPM number 2 captures Data from the Global bus;

FIG. 8 represents a global interrupt sequence as follows:

1. A system module (master or resource) generates an interrupt request signal (START);
2. MPM number 0 responds with an interrupt acknowledge signals (IACK);
3. MPM number 0 then waits until its next time slice occurs. It them asserts the Interrupt vector request signal (IVRQ) and negates the Data Stroble (DS) signal;
4. The requesting module puts its interrupt Vector onto the data bus and asserts the Data Ready signal;
5. MPM number 0 latches the interrupt vector from the global data bus and negates the Interrupt Acknowledge and vector request signals;
6. (END).

The systems shown in the schematic drawings are intended to be representative only. It will be clear to those skilled in the art that many variations on those shown may be employed. All such variations are intended to be within the scope and spirit of the present invention.

I claim:

1. A synchronous data processing system comprising:
    N processor modules, each processor module including a processor and interface circuitry connected with the processor;
    at least one resource module available for access by the processor modules;
    a signal global microprocessor bus system commonly shared by the resource module and each of the processor modules, the resource module and the interface circuitry of each of the processor modules being connected in parallel to the bus system to enable communication among the processor modules and between the processor modules and the resource module; and
    system timing means connected with the bus system for dividing a predetermined bus cycle time period into N equal time slices, each processor module being granted access to the global bus for a single time slice during each bus cycle time period;
    the interface circuitry of each processor module being configured to permit each processor to execute data received from a resource module directly as an instruction and being configured to enable each processor module to communicate information in signle word messages during the processor module's respective time slice so that the length of communication among any two of the processor modules and between any processor module and the resource module does not inhibit access by any other processor module to the resource module and to either of said two processor modules.

2. The data processing system as recited in claim 1 wherein the processor modules are each assigned a module number running sequentially from 0 to N−1, and the time slices are each assigned a number running sequentially from 0 to N−1, each processor module being granted access to the global bus during the numbered time slice which corresponds to its module number.

3. The data processing system as recited in claim 2 wherein:
    the system timing means includes a counter for generating consecutive repeating count signals from 0 to N−1, the counter outputting the count signals onto the global bus system; and
    decoder circuitry within the interface circuitry of each processor module for receiving the count signals and for granting access to the global bus system when a count signal corresponds to the module number of the particular processor.

4. The data processing system as recited in claim 2 wherein the predetermined bus cycle time period is 500 nanoseconds.

5. The data processing system as recited in claims 1 or 4 wherein the global bus system comprises a time slice and clock bus, a data bus and address bus, each of said buses including a plurality of lines.

6. The data processing system as recited in claim 2 wherein the processor modules are all of the same structure and wherein the module numbers are assigned in a completely arbitrary manner.

7. The data processing system as recited in claim 1 wherein each processor module is fully self-sufficient and capable of asynchronous operation itself without regard to the global bus.

8. A synchronous data processing system comprising:
    N processor modules, each processor module including a processor and interface circuitry connected with the processor;
    a single global microprocessor bus system commonly shared by each of the processor modules, the interface circuitry of each of the processor modules being connected in parallel to the bus system to enable communication among the processor modules;
    system timing means connected with the bus system for dividing a predetermined bus cycle time period into N equal time slices, each processor module being granted to access to the global bus for a single time slice during each bus cycle time period;
    the interface circuitry of each processor module being configured to enable each processor module to communicate information in single word messages during the processor module's respective time slice so that the length of communication between any two processor modules does not inhibit access by any other processor module to either of said two processor modules.

* * * * *